April 28, 1970 R. W. LANDEE 3,509,457

FREQUENCY DISCRIMINATOR CIRCUIT EMPLOYING TWO SELF-CALIBRATING FREQUENCY DISCRIMINATORS

Filed Dec. 20, 1962 4 Sheets-Sheet 1

INVENTOR.
ROBERT W. LANDEE

BY Moody and Rollins
ATTORNEYS

INVENTOR.
ROBERT W. LANDEE
BY Moody and Phillips
ATTORNEYS

INVENTOR.
ROBERT W. LANDEE
BY Moody and Phillips
ATTORNEYS

INVENTOR.
ROBERT W. LANDEE
BY Moody and Phillips 3,509,457
Patented Apr. 28, 1970

3,509,457

FREQUENCY DISCRIMINATOR CIRCUIT EMPLOYING TWO SELF-CALIBRATING FREQUENCY DISCRIMINATORS

Robert W. Landee, 5107 Woodley, Encino, Calif.

Filed Dec. 20, 1962, Ser. No. 249,107
Int. Cl. G01r *23/12*
U.S. Cl. 324—82 8 Claims This invention relates, generally, to frequency discriminator circuits and, more particularly, to a frequency discriminator circuit employing two separate frequency discriminators which are alternately switched between a utilization circuit and a calibration circuit, with one discriminator being calibrated while the other is being employed in the utilization circuit.

In almost all applications of frequency discriminators it is desired that the frequency discriminator remain tuned to some given nominal center frequency. This is true of the relatively simple home FM receiver and is also true of more sophisticated communication gear. However, in the more elaborate type electronic gear, manual control of the frequency discriminator often is not as suitable as it is in a home receiver. It is necessary in many instances that tuning of a frequency discriminator be automatic and that calibration reoccur at certain time intervals. A specific instance where automatic calibration is needed is in a communication system employing a time synchronous phased pulse system of encoding information. In such a system a phase of a tone signal is changed at regular periodic intervals, with the information contained in the tone signal during any such time period being determined by the relationship of the phase of said signal with some constant reference phase, such as the phase of the tone signal during the preceding time period. More than one channel of information can be carried on a single tone signal with this method of encoding and usually more than one tone signal is employed in a given system. It is necessary that the tone signals be separated at the receiver. To perform such separating function, filter circuits are employed which separate the tone signals by virtue of their different frequencies. However, such filter circuits can accomplish the separation effectively only if the received tone signals have their expected frequency. Very little frequency deviation of the tones can be tolerated. In some cases, however, the frequency of the tone signal will deviate from the transmitted frequency. For example, in the case of airborne equipment, the frequency of the received signal can vary from the expected frequency due to the Doppler effect. In such cases it is necessary to detect the frequency deviation and then correct the received signal to the proper frequency. Detection of any frequency deviation of the tone signal can be accomplished by frequency discriminator means which must be tuned accurately at all times.

There are, of course, other applications wherein it is desired that accurate frequency detection be maintained.

It is an object of this invention to provide a frequency discriminator means which is automatically calibrated.

It is a further purpose of invention to provide a reliable and accurate frequency discriminator circuit which will automatically calibrate itself at periodic time intervals.

A third aim of the invention is to provide a means for automatically correcting the frequency of a received signal to remove any frequency deviation therein with respect to a standard frequency reference.

A fourth object of the invention is a circuit for removing frequency error caused by the Doppler effect in a received signal.

A fifth purpose of the invention is the improvement of frequency correction circuits, generally.

In accordance with the invention there is provided a pair of frequency discriminators, each having for calibrating purposes, a feedback circuit including a servo motor which, when energized, will tune the frequency discriminator to the frequency of the calibrating signal. Also provided is a calibrating frequency source, a received input signal source, and a utilization means. Each of the frequency discriminators has two modes of operation. The first mode is herein defined as a calibrating mode and the second mode as the operating mode. In the calibrating mode the calibrating frequency standard is supplied to the input of the frequency discriminator and the output of the frequency discriminator is supplied to the feedback circuit thereof to energize the servo motor and thereby tune the frequency discriminator to the frequency of the calibrating frequency reference. In the operating mode the input of the frequency discriminator is disconnected from the calibrating frequency reference and the feedback loop is disconnected from the output of the frequency discriminator and disabled. Further, the input signal source is connected to the input of the frequency discriminator and the output signal from the frequency discriminator is supplied to the utilization means. Switching means are provided to alternately connect the two frequency discriminators into their two operating modes. During the time one frequency discriminator is in its operating mode, the said switching means will switch the other frequency discriminator into its calibrating mode.

It should be noted that the foregoing statement is not entirely true in that a frequency discriminator, which has just been calibrated, will have its input terminal switched to the received signal source slightly before its output is connected to the utilization means, and also slightly before the other frequency discriminator is switched from its operating mode to its calibrating mode. The aforementioned overlap, called the stabilization mode, is provided to permit the frequency discriminator which is about to be switched into the operating mode to first become stabilized to the different frequency of the input signal before switching occurs. It is to be understood that during the stabilization period, the feedback circuit of the discriminator being stabilized is disabled.

The above-mentioned and other objects and features of the invention will be more fully understood from the following description thereof when read in conjunction with the drawing in which:

FIG. 1 is a combination block diagram and schematic diagram of the invention;

FIGS. 2*a*, 2*b*, and 2*c* are timing diagrams showing the relationship between the time intervals during which the two frequency discriminators are in the operating mode or in the calibrating mode;

Figure 1:
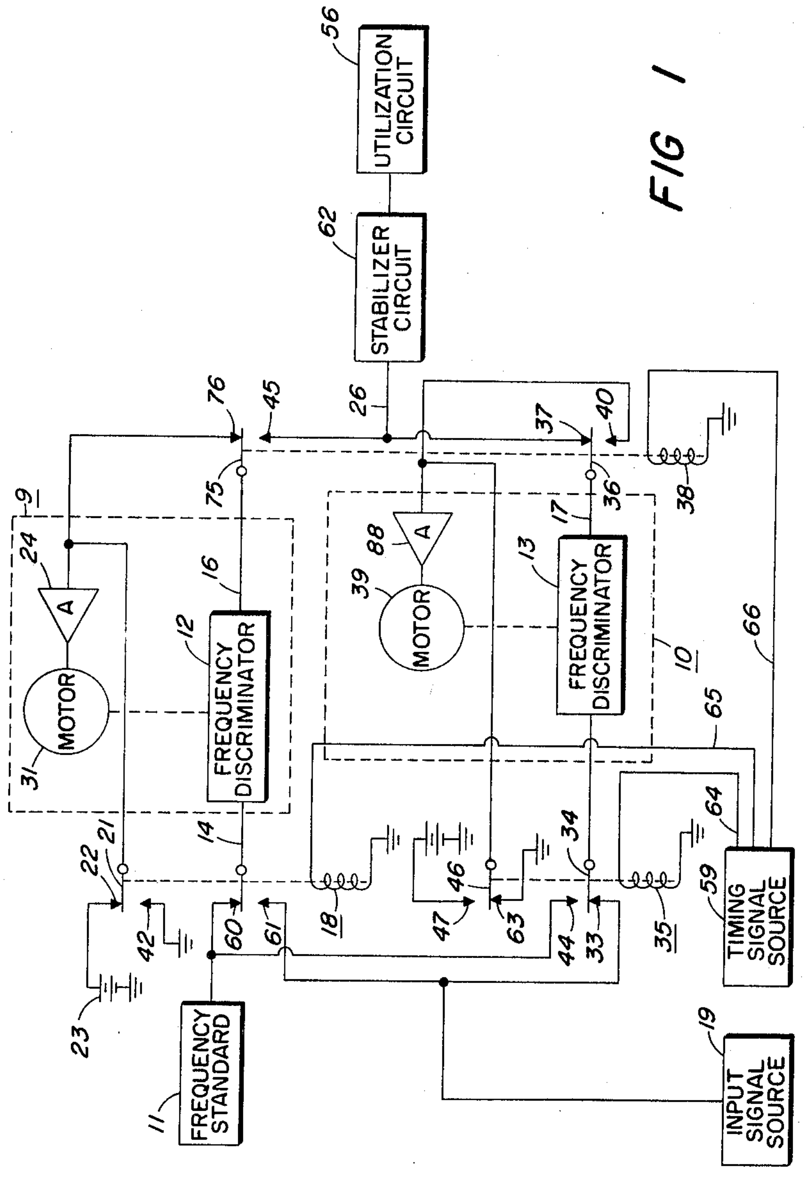

Referring now to FIG. 1, there is shown within the dotted blocks 9 and 10 two self-calibrating discriminator circuits which are alternately connected into the operating mode and the calibrating mode. Each of the frequency discriminator circuits contained within the blocks 9 and 10 is comprised of a tunable frequency discriminator circuit and a feedback calibrating circuit. More specifically, the self-calibrating frequency discriminator circuit 9 is comprised of the tunable frequency discriminator 12 and a feedback system consisting of amplifier 24 and servo motor 31. The self-calibrating frequency discriminator circuit 10 is comprised of tunable frequency discriminator circuit 13 and a feedback circuit comprised of amplifier 38 and servo motor 39. The switching means comprises relays 18, 35, and 88, which function to switch the two self-calibrating discriminator circuits 9 and 10 into their operating modes and their calibrating modes, are shown outside the dotted blocks 9 or 10. Calibrating frequency standard 11 also is not included within the blocks 9 or 10.

Discriminator circuits 9 and 10 operate in a similar manner although in a staggered time relationship. In the specific diagram of FIG. 1, the discriminator 9 is shown in its calibrating mode and the discriminator 10 is shown in its operating mode. Such specific operating conditions are established by virtue of the fact that relay 35 is energized and relays 18 and 38 are de-energized.

With discriminator 9 in its calibrating mode the output signal of the frequency standard 11 is supplied to the input terminal 14 of discriminator 12 through contact 60. The output signal appearing on output lead 16 of discriminator 12 is supplied to the input of amplifier 24 through armature 75 and contact 76 of relay 38. The servo motor 31 responds to the output signal of amplifier 24 to tune the tunable discriminator 12 until a null appears on its output lead 16. It is to be noted that in the calibrating mode the amplifier 24 is enabled by the positive battery source 23, which is connected to the input of amplifier 24 through contact 22 and armature 21.

In its operating mode the frequency discriminator 10 receives the input signal from source 19 through contact 33 and armature 34 of energized relay 35, and responds thereto to produce a D-C signal on its output lead 17. The said D-C signal, which indicates the direction and amount of frequency deviation from the calibrated frequency of the discriminator 13, is supplied to the output terminal 26 and to stabilizer circuit 62 through armature 36 and contact 39 of de-energized relay 38.

During the operating mode amplifier 88 and motor 39 are deenergized by the grounding of the input terminal of amplifier 88 through armature 46 and contact 63 of energized relay 35.

As stated above, there is a third mode in which the frequency discriminators 9 and 10 may be placed in addition to the operating and calibrating modes. The third mode, defined as the stabilizing mode, is attained by switching the input lead of a frequency discriminator 9 or 10 from the calibrating source 11 to the input signal source at the end of the calibrating mode for a short interval of time before connecting the output of said frequency discriminator to the output terminal 26. The output of the other frequency discriminator remains connected to the output terminal 26 during the stabilizing period. By such stabilizing mode the newly calibrated frequency discriminator becomes stabilized to the possibly different frequency of the received input signal before being switched into its operating mode, thus minimizing transient conditions. During stabilization the feedback circuit is disabled.

It is apparent that some timing means is required to switch the two frequency discriminating circuits 9 and 10 into their various modes at the proper times. Such a timing source 59 is shown in FIG. 1 and is constructed to produce on its output terminals 64, 65, and 66, timing signals for controlling the energization of relays 35, 18, and 38, respectively.

Figure 2A:
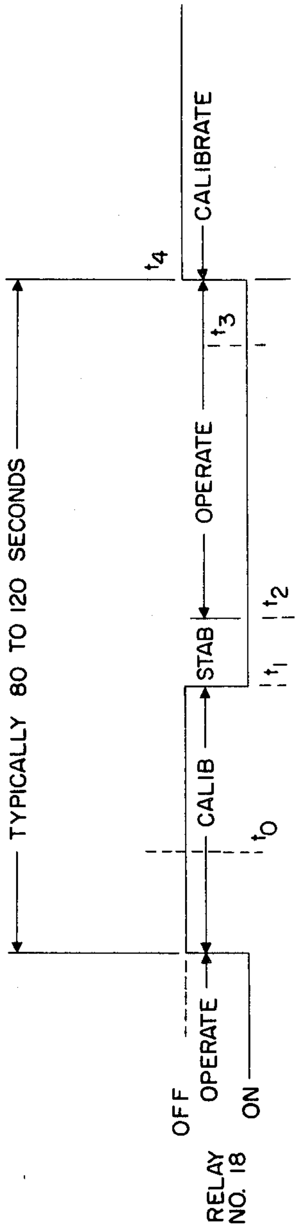
Figure 2B:
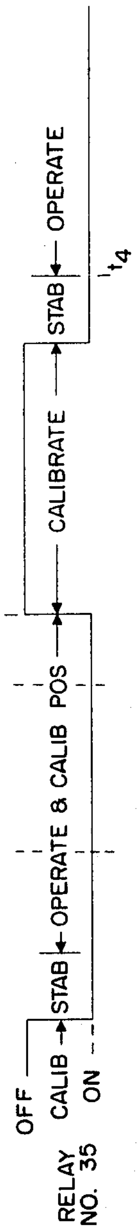
Figure 2C:
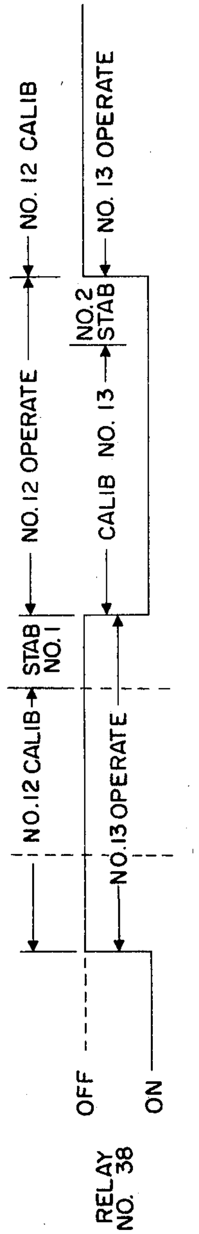

In FIGS. 2*a*, 2*b*, and 2*c* there are shown timing charts which define specifically the time relationship between the various modes of the frequency discriminator circuits 9 and 10. The particular condition of the frequency discriminator circuit, as shown in FIG. 1, is represented at time $t_0$ in FIGS. 2*a* through 2*c*, at which time relays 18 and 38 are de-energized, and relay 35 is energized. The operation of frequency discriminators 9 and 10 under such conditions has already been discussed.

At time $t_1$ the relay 18 becomes energized, thus connecting the input signal source 19 to the input lead 14 of discriminator 12 through the contact 61 of relay 18. Simultaneously, the armature 21 of relay 18 breaks with contact 22 and makes with contact 42, thus disabling the amplifier 24 and the servo motor 31. During the time interval $t_1$–$t_2$ frequency discriminator 12 will be connected to the input signal source 19, but its output terminal 16 will be, in effect, short circuited since amplifier 24 and servo motor 31 are disabled (the armature 75 is still making with the contact 76). Also during time interval $t_1$–$t_2$, frequency discriminator 12 will become stabilized with respect to the received input signal now being supplied to its input terminal. At time $t_2$ relay 35 will become de-energized and relay 38 will become energized, as shown in FIGS. 2*b* and 2*c*, to perform three functions. These three functions are as follows. The tunable frequency discriminator 13 will have its input terminal connected to the calibrating frequency standard source 11 through contact 44 and its output terminal 17 connected to the input of amplifier 88. Thirdly, the output terminal 16 of discriminator 12 will be connected to output terminal 26 through contact 45 of relay 38. The stabilizer circuit 62 has a flywheel-type action which will provide a smooth transition during the change of frequency discriminator circuits.

During the time interval $t_2$–$t_3$, the discriminator circuit 13 is calibrated. At the end of time interval $t_2$–$t_3$, relay 35 will operate to switch the input of the frequency discriminator 13 back to the input signal source 19 through contact 33 and will disable amplifier 88 and servo motor 39 by grounding the input of amplifier 88 through the armature 46 and contact 63. Then, during time interval $t_3$–$t_4$, the discriminator circuit 13 will become stabilized to the frequency of the received input signal. At time $t_4$ both relays 18 and 38 will be de-energized to switch frequency discriminator 10 into its operating mode and the frequency discriminator circuit 9 into its calibrating mode, thus completing a full cycle of operation.

The utilization circuit 56 can be any suitable load into which it is desired to supply the output signal of the circuit.

Figure 3:
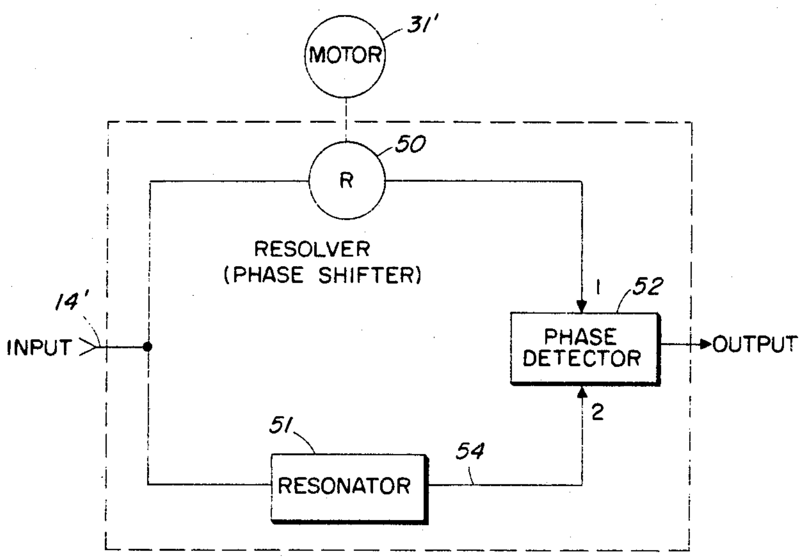
FIG. 3 is a block diagram of particular frequency discriminator which may be employed in the circuit of FIG. 1.
Figure 4:
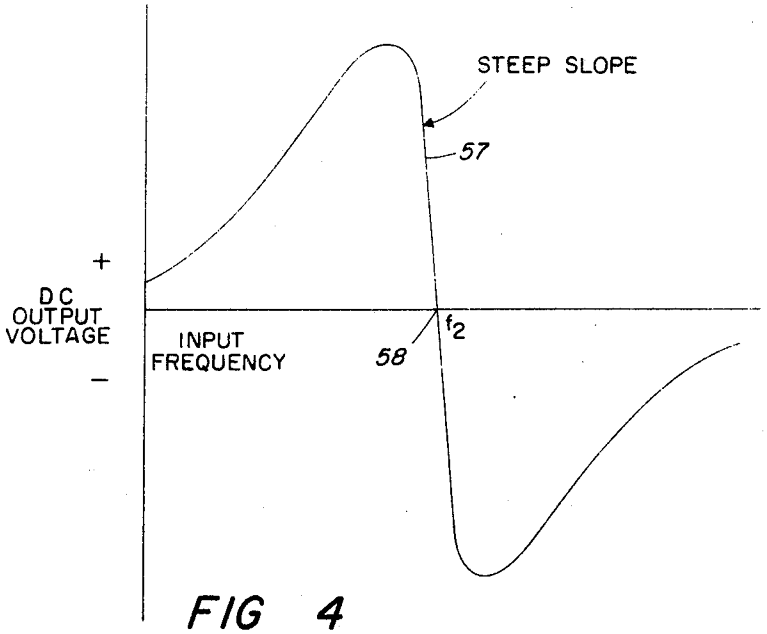
FIG. 4 shows a frequency characteristic responsive curve of the frequency discriminator of FIG. 3.

A particular type of frequency discriminator circuit which may be employed in blocks 12 and 13 of FIG. 1 is shown in FIG. 3 and comprises a resolver 50, a resonator 51, and a phase detector 52. The resolver 50 is driven by the servo motor 31' which corresponds to the servo motor 31 of FIG. 1. The purpose of the resolver 50 is to introduce into the signal supplied on input lead 14' a phase shift of 90° with respect to the phase of the signal appearing on output terminal 54 of resonator 51. Resonator 51 preferably is a high Q device which will produce a rather marked change in phase in the signal supplied thereto as the frequency of said signal varies from the center tuned frequency of the resonator 51. On the other hand, the resolver 50 should exhibit comparatively little change in phase as a result of frequency changes of the input signal supplied thereto. Consequently, the phase detector 52 will produce a D-C output signal having a frequency response characteristic with the steep slope 57 shown in FIG. 4. It should be noted that since the phases of the output signals of the resolver 50 and the resonator 51 are to be maintained 90° apart, the phase detector 52 should be of the type which produces a zero D-C voltage under such phase conditions.

Figure 5:
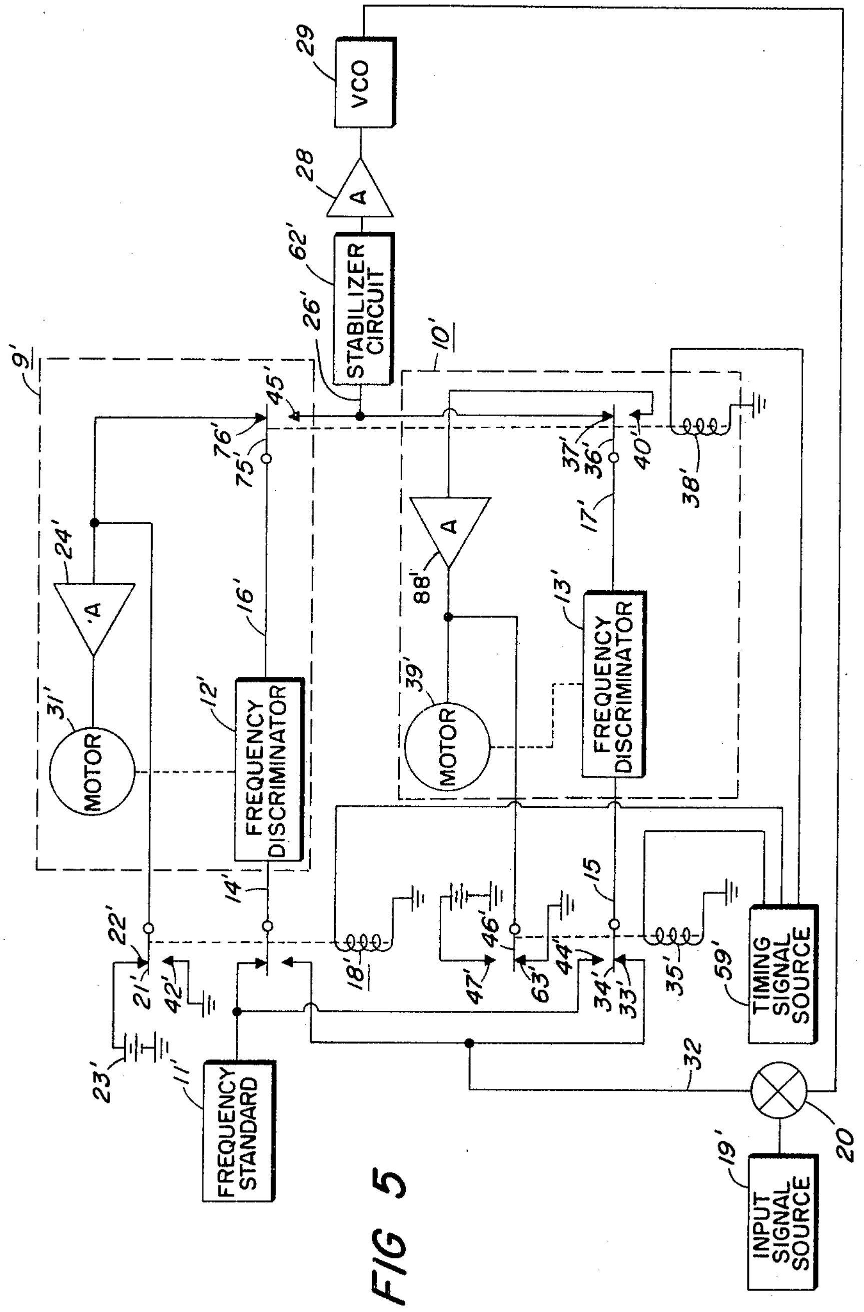
FIG. 5 shows a specific application of the invention.

Referring to FIG. 5, there is shown an application of the invention in which the frequency of the received input signal is corrected for error introduced therein as, for example, by Doppler effect. All the elements of FIG. 5 which correspond to elements shown in FIG. 1 are identified by the same reference character, although primed in FIG. 5. In addition, in FIG. 5, the circuit elements including amplifier 28, variable control oscillator 29 and mixer 20 have been added, which perform the function of correcting frequency error. As an example, assume that the frequency of the input signal of source 19' is 10 cycles too high, as compared to the frequency of the standard 11', to which frequency the discriminators 12' and 13' are tuned. In such an event, the frequency of a signal appearing on the output of the mixer 20 would, in the absence of the frequency correcting circuit, be 10 cycles too high. However, since the frequency discriminator in the operating mode has a tuned center frequency equal to that of the standard 11', there will be produced at the output terminal 26' a D-C voltage which is amplified by amplifier 28 and then supplied to the variable control oscillator 29. The variable control oscillator 29 is constructed to respond to the amplified D-C signal to produce an output signal having a frequency which when mixed with the input signal from source 19' in mixer 20, will produce on lead 32 a signal having a corrected frequency (usually an intermediate frequency) substantially equal to the frequency of the standard frequency source 11'.

For a more detailed description of the type frequency discriminators employed in blocks 12 and 13 of FIGS. 1 and 5, reference is made to co-pending application filed on the same date as the present application by Robert W. Landee and entitled "Frequency Discriminator Circuit." Said co-pending application is incorporated herein by reference.

I claim:

1. Continuously operable self-calibrating frequency discriminator means comprising first and second self-calibrating frequency discriminator circuits each comprising input and output terminals, a frequency discriminator, and a servo system, said servo system constructed to respond to the output signal of said frequency discriminator to tune said frequency discriminator to an applied calibrating frequency, calibrating frequency source means, input signal source means, terminal means, switching means for alternately switching said input signal source means and said calibrating frequency source means to the inputs of said first and second self-calibrating frequency discriminator circuits, first and second disabling means responsive to said switching means to disable that servo system responsive to the frequency discriminator to which said input signal is being supplied, timing means constructed to cause said switching means to alternately connect said input signal source to the first and second self-calibrating frequency discriminators, other switching means for alternately and exclusively connecting the output terminals of each of said first and second self-calibrating frequency discriminator circuits to said terminal means during the time intervals that the input signal source is connected to the corresponding one of said first and second self-calibrating frequency discriminator circuits.

2. Continuously operable self-calibrating frequency discriminator means in accordance with claim 1 in which each of said self-calibrating frequency discriminator circuits comprises resonator means and phase shifting means having a common input terminal, said resonator means causing substantially greater phase deviation with frequency change than said phase shifting means, and phase detector means constructed to respond to the output signals of said resonator means and said phase shifting means to produce a signal indicative of the deviation of the frequency of an applied signal from the center tuned frequency of said resonator means.

3. Continuously operable self-calibrating frequency discriminator means in accordance with claim 1 in which said timing means is constructed to cause said switching means to operate to connect said input signal source to the input terminal of one of said self-calibrating frequency discriminator circuits a short time interval before said input signal source is disconnected from the other of said self-calibrating frequency discriminator circuits and in which said timing means further causes the output terminal of a given one of said self-calibrating frequency discriminator circuits to be connected to said output means substantially at the same time that said input signal source is disconnected from the other of said self-calibrating frequency discriminator circuits.

4. Continuously operable self-calibrating frequency discriminator means in accordance with claim 3 in which each of said self-calibrating frequency discriminator circuits comprises resonator means and phase shifting means having a common input terminal, and phase detector means constructed to respond to the output signals of said resonator means and said phase shifting means to produce a signal indicative of the deviation of the frequency of an applied signal from the center tuned frequency of said resonator means.

5. A frequency control system including an input signal source, a variable controlled oscillator and a mixer circuit constructed to be responsive to the frequency of said input signal from said input signal source and the output signal from said variable controlled oscillator to produce a resultant signal having a frequency determined by the frequency of said input signal and the output signal of said variable controlled oscillator, a continuously operable self-calibrating frequency discriminator means for detecting variations of the frequency of said resultant signal from a predetermined calibrating frequency and comprising first and second self-calibrating frequency discriminator circuits each comprising input and output terminals, a frequency discriminator, and a servo means, said servo means constructed to respond to the output signal of said frequency discriminator to tune said frequency discriminator to said calibrating frequency, frequency calibrating signal source means, input signal source means, output means connected to the input of said variable controlled oscillator, first and second switching means for alternately supplying said resultant signal and said calibrating signal to the input terminals of said first and second self-calibrating frequency discriminator circuits, first and second disabling means responsive to said first and second switching means, respectively, to disable the servo means responsive to that self-calibrating frequency discriminator to which said resultant signal is being supplied, timing means constructed to cause said first and second switching means to alternately connect said resultant signal to the input terminals of said first and second self-calibrating frequency discriminator circuits, third switching means for alternately connecting the output terminals of said first and second self-calibrating frequency discriminator circuits to said output means during the time intervals that said resultant signal is connected to said first and second self-calibrating frequency discriminator circuits.

6. Continuously operable self-calibrating frequency discriminator means in accordance with claim 5 in which each of said self-calibrating frequency discriminator circuits comprises resonator means and phase shifting means having a common input terminal, said resonator means causing substantially greater phase deviation with frequency change than said phase shifting means, and phase detector means constructed to respond to the output signals of said resonator means and said phase shifting means to produce a signal indicative of the deviation of the frequency of an applied signal from the center tuned frequency of said resonator means.

7. Continuously operable self-calibrating frequency discriminator means in accordance with claim 5 in which said timing means is constructed to cause said first and second switching each to operate to connect said resultant signal to the input terminal of a given one of said self-calibrating frequency discriminator circuits a short time interval before said resultant signal is disconnected from the other of said self-calibrating frequency discriminator circuits and in which said timing means further is constructed to cause said third switching means to connect the output terminal of said given one of said self-calibrating frequency discriminator circuits to said common output terminal at substantially the same time that said resultant signal is disconnected from the other of said self-calibrating frequency discriminator circuits.

8. Continuously operable self-calibrating frequency discriminator means in accordance with claim 7 in which each of said self-calibrating frequency discriminator circuits comprises resonator means and phase shifting circuit having a common input terminal, and phase detector means constructed to respond to the output signals of said resonator means and said phase shifting means to produce a signal indicative of the deviation of the frequency of an applied signal from the center tuned frequency of said resonator means.

References Cited

UNITED STATES PATENTS 3,054,053 9/1962 Cook ---------------- 324—82

RICHARD A. FARLEY, Primary Examiner

C. E. WANDS, Assistant Examiner